Figure 1:
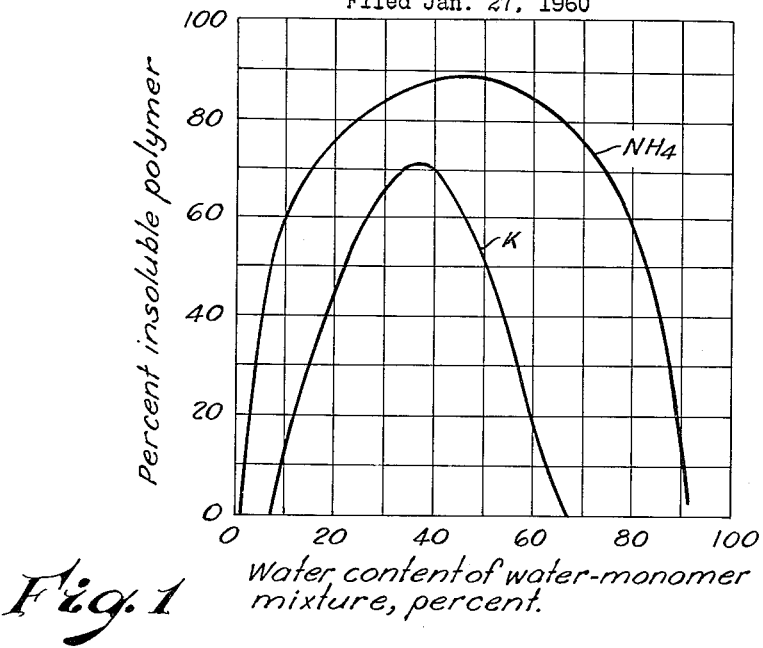

INVENTORS.
Robert N. Bashaw
Billy G. Harper

United States Patent Office 3,090,736
Patented May 21, 1963

3,090,736
INSOLUBLE POLYACRYLIC ACID SALTS AND METHOD OF PREPARING THE SAME
Robert N. Bashaw, Freeport, and Billy G. Harper, Lake Jackson, Tex., assignors to The Dow Chemical Company, Midland, Mich., a corporation of Delaware
Filed Jan. 27, 1960, Ser. No. 5,059
10 Claims. (Cl. 204—154)

This invention relates to the polymerization of salts of acrylic acid. More particularly, it is concerned with a method of polymerization which gives rise to cross-linked, insoluble polymers. Specifically, it relates to a method of employing high energy ionizing radiation to produce the desired insoluble polymeric salts.

Salts of polyacrylic acid may readily be prepared by polymerization of salts of acrylic acid by conventional means. In addition, they may be prepared by the neutralization of polyacrylic acid or by double decomposition reaction between a soluble polyacrylate and soluble salts of polyvalent metals whose polyacrylic acid salts are insoluble.

The insolubility of the polyacrylate salts produced by such double decomposition reaction is not due to the development of permanent cross-linkages between polymer molecules. Rather, it is apparently the result of the formation of an ionic linkage involving carboxylic acid groups of different polymer chains and the polyvalent cation in question. Such a linkage may be termed temporary when compared with the carbon-to-carbon cross-linking in the polymer chain. Replacement of the polyvalent cation by hydrogen ion or by a monovalent cation of an alkali metal causes rupture of the temporary linkage and the reformation of either soluble polyacrylic acid or its soluble alkali metal salt. Even treatment with moderately alkaline substances such as ammonium hydroxide or dilute solutions of alkali metal carbonates, as shown by the teachings of U.S. 2,045,080, will cause redispersion of these insoluble polyacrylates.

The alkali salts, including the ammonium salt, of polyacrylic acid are essentially completely water soluble. Their aqueous solutions, as well as solutions of polyacrylic acid itself, may vary from relatively free flowing liquids to highly viscous materials, depending on a number of factors, such as the degree of polymerization of the acid, the extent of neutralization, and the like. These soluble salts have found some use as textile sizings and as soluble coatings. The insoluble salts of polyvalent cations have found limited use in medicine and photography.

However, insoluble polyacrylic acid salts of the alkali metals are to be preferred over the known soluble polymers for certain applications. Furthermore, permanently insoluble polyvalent cation salts of polyacrylic acid offer certain advantages over the above described "temporarily" insoluble materials obtained by double decomposition reaction.

Accordingly, it is the principal object of the invention to provide a method for the production of cross-linked, water insoluble salts of polyacrylic acid.

Another object of the invention is to provide a method of controlled insolubilization and cross-linking of salts of polyacrylic acid without the use of chemical cross-linking agents.

Other objects of the invention will become apparent from the specification and examples to follow.

According to the present invention, insoluble, cross-linked products are obtained by the action of high energy ionizing radiation on mixtures of salts of acrylic acid or polyacrylic acid and water. It is within the scope of the invention to pre-polymerize a salt of acrylic acid by conventional means and to expose a mixture of water and the resulting polyacrylate salt to the influence of high energy ionizing radiation. Alternatively, and preferably, a mixture of water and the monomeric salt is irradiated to cause polymerization and cross-linking of the resultant polymer in one operation.

It will be understood that the initial action of ionizing radiation on the monomeric starting materials of the invention is to induce polymerization. As is well recognized in the art, such radiation induced polymerization is dose-rate dependent. That is, radiation of a lower intensity gives rise to polymers of higher molecular weight than does radiation of a higher intensity. Accordingly, a lower total dose of radiation is required to produce a given amount of insoluble polymer if the radiation is of low intensity.

It will be obvious that a smaller dose of radiation is required to obtain insoluble polymer if a conventionally pre-polymerized salt is employed as a starting material rather than the monomeric salt.

While it is essential that the salts be irradiated in the form of a mixture thereof with water, the composition of such mixtures is not highly critical. That is, cross-linked polymers can be prepared from mixtures of a relatively wide range of composition. In general, cross-linked polymers are formed when water is present in an amount of from about 20 percent to about 80 percent of the total weight of the aqueous mixture.

Within this stated range of composition, the amount of insoluble polymer produced at a given concentration may be increased by increasing the total dose of radiation to which the mixture is exposed. The optimum concentration, which is that concentration at which a given dose of radiation produces the maximum amount of insoluble polymer, will vary within this range depending on the starting material employed.

Outside of the above mentioned ranges of composition, the usual effect of high energy ionizing radiation on the aqueous mixture is to induce polymerization of the monomeric component without causing sufficient cross-linking to make it insoluble. Thus, in the case of an alkali metal acrylate, for example, a soluble polymer is formed, but the desired insolubilization does not ordinarily take place.

Solutions of polyvalent metal cation salts of acrylic acid, such as calcium acrylate, also form polymers outside of the stated range. These polymers, however, while being inherently insoluble by virtue of the ionic bonds, are not permanently cross-linked and exchange of an alkali metal or a hydrogen ion for the calcium ion gives rise to a freely soluble product.

With both monovalent and polyvalent metal salts, however, insoluble polymer will result if a sufficiently large total dose of radiation is employed.

Doses of ionizing radiation of from about 0.001 megarad to about 50 megarads will produce the desired cross-linked polymers of the invention. Below the lower limit of this range relatively little cross-linking occurs, although water soluble polymers may be produced. Very high doses outside the upper limit of this range tend to bring about undesirable degradation of the polymer formed. A dosage of from about 0.005 megarad to about 20 megarads is preferred and the optimum dose generally is in the range of from about 1 megarad to about 10 megarads. The intensity of the radiation is not critical. It is necessary only that the dosage rate be such that the desired dosage may be achieved within a reasonable period of time. In general, an intensity of at least 0.27 megarad per hour is desirable.

The term megarad, a unit of absorbed radiation energy, is defined as a million rads. The rad in turn is defined as the absorption of 100 ergs of energy per gram of sample.

The method of the invention permits a choice of any of the usual sources of high energy ionizing radiation. Electron beams, which may be provided by the Van de Graaff type of accelerator or a resonant transformer electron accelerator, are useful in the practice of the invention. Gamma radiation, such as that produced by a cobalt-60 source, may be used advantageously. Radiation from atomic fission waste products and X-rays also function as excellent initiators of polymerization and of cross-linking in the reaction.

The polymerization is usually carried out at ambient temperature, although higher temperatures may be employed if desired, provided the temperature is maintained below the decomposition temperature of both the monomer and of the resulting polymer. In general, the reaction may conveniently be carried out in the temperature range of from about 20° C. to about 100° C.

The products of the radiation induced cross-linking differ in a manner depending on the salt whose mixture with water is subjected to radiation. The polyvalent metal cation salts give rise to an insoluble precipitate of the cross-linked polyacrylate. This precipitate is generally in the form of a solid, coherent mass which does not swell in water to any marked extent. To facilitate drying this mass is advantageously ground to a coarse powder, and, if desired, unreacted soluble salts may be removed from this powder by extraction with water.

The products obtained from the irradiation of mixtures of water and an alkali metal acrylate do not separate from the aqueous phase as a precipitate. The insoluble polyacrylate and the water form a stable, stiff gel of high water content. Soluble material may be removed from this gel by repeated extraction with water. Excess water is drained from the gel by filtration on a coarse screen and the product retained on the screen is dried to produce a hygroscopic powder. Redispersion of this dry material in water produces a stable gel structure.

The cross-linked alkali metal polyacrylates are useful for gelling various aqueous systems. Furthermore, the high water retentivity of the gels obtainable from these salts make them ideally suited to use as soil conditioners. Because of their insolubility they exhibit no tendency to leach out of the soil. Their intumescent character in the presence of water greatly improves the moisture retentivity of the treated soil.

The products of the invention are capable of ion exchange, displaying a high capacity as weak cation exchangers. As such, they may advantageously be employed to introduce into soil desirable amounts of certain nutrient elements required for plant growth.

The invention is further illustrated in and by the following examples wherein, unless otherwise indicated, all parts and percentages are on a weight basis.

EXAMPLE 1

Mixtures of water and potassium acrylate of varying water content were exposed to the influence of high energy ionizing radiation from a 1 mev. General Electric electron beam generator. Mixtures of water and ammonium acrylate were similarly treated. The electron beam generator at a beam current setting of 1 milliampere provided radiation of an intensity of 0.65 megarad per second. Irradiation was continued for a time sufficient to afford a total dose of 2.29 megarads.

In each case the effect of the irradiation was to convert the mixture to a relatively stiff gel. These gels were extracted with about 400 times their weight of water and were then separated from excess of water by filtration on a large mesh screen. The material retained by the screen was dried to give the products as hygroscopic powders.

The results of the experiment are set out graphically in FIGURE 1, wherein the yield of insoluble polymer, expressed as a percentage of monomer employed, is shown as a function of the composition of the water-monomer mixture. The polymers obtained were easily redispersed in water and, when so dispersed, rapidly absorbed water to form a gel.

EXAMPLE 2

A solution of potassium acrylate in water containing 10 percent of the salt was exposed to a total dose of 50 megarads of radiation from the 1 mev. electron beam generator at an intensity of 3.25 megarads per second. After being irradiated the solution showed no apparent change. A solution containing about 15 percent of potassium acrylate was then exposed to an equivalent dosage of radiation. After irradiation this solution displayed visually observable gelation.

EXAMPLE 3

A mixture of 95 parts of potassium acrylate and 5 parts of water was exposed to a total dose of 3.0 megarads of radiation from the 1 mev. electron beam generator at an intensity of 3.25 megarads per second. No insoluble polymer could be isolated from the reaction mixture. A mixture containing 90 parts of potassium acrylate and 10 parts of water and a second mixture containing 80 parts of potassium acrylate and 20 parts of water were then exposed to the same dosage of radiation. In both cases gel formation occurred.

EXAMPLE 4

A mixture of 90 parts of potassium acrylate with 10 parts of water was exposed to a total dose of 25 megarads of radiation from the 1 mev. electron beam generator. A yield of about 50 percent of insoluble polymer, based on weight of monomeric material, was obtained.

EXAMPLE 5

Following the procedure of Example 1, solutions of various concentrations of sodium acrylate in water and lithium acrylate in water were exposed to a total dose of 2.29 megarads of radiation from the 1 mev. electron beam generator at an intensity of 0.65 megarad per second. It was determined that maximum yield of insoluble polymer under these conditions was obtained from a solution containing about 35 percent of sodium acrylate. In the case of lithium acrylate this optimum concentration was found to be about 40 percent.

EXAMPLE 6

Samples of anhydrous potassium acrylate were irradiated with an electron beam from the 1 mev. General Electric electron beam generator. The intensity of the radiation was maintained at a constant level. The time of exposure of the several samples was varied to provide for different total radiation dosage of from about 0.1 to about 30 megarads. The irradiated samples were washed with anhydrous methanol to remove residual monomer; the polymer was filtered free of methanol and dried. The products were found to be completely soluble in water in contrast to the insoluble products obtained in the presence of water according to Example 1.

EXAMPLE 7

A completely water soluble ammonium polyacrylate salt (Acrysol G–110, manufactured by Rohm and Haas) was irradiated in the form of a 22 percent solution of the salt in water. The 1 mev. electron beam generator was employed as the radiation source and the total radiation dose was 2.14 megarads. An insoluble product resulted and the solution set to a firm gel.

EXAMPLE 8

Solutions of ammonium acrylate in water containing 65 percent of the salt were exposed to gamma radiation from a cobalt-60 source. Times of exposure were chosen to give doses of radiation varying from 0.001 to 50 megarads. Insoluble polymer was obtained at all dosage levels.

EXAMPLE 9

Figure 2:
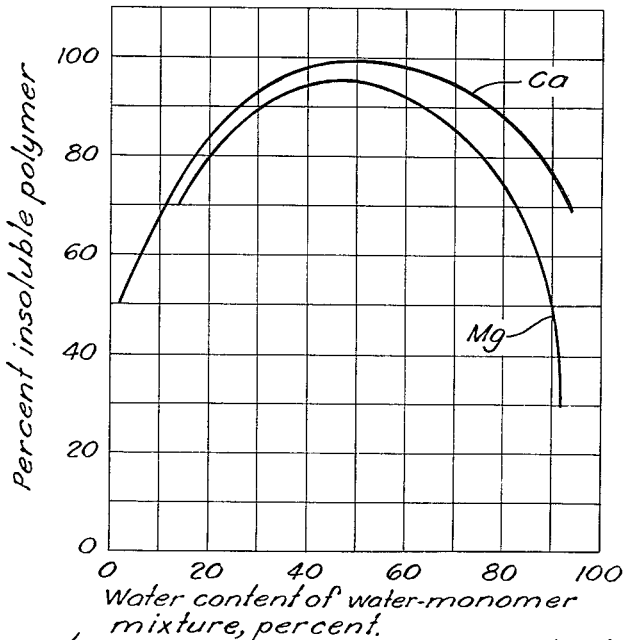

Solutions of calcium acrylate and magnesium acrylate of several concentrations, as shown in FIGURE 2, were exposed to a dose of 2.14 megarads of radiation from the 1 mev. electron beam generator. In all cases a precipitate was obtained. These precipitates were coarsely ground, extracted with water to remove soluble matter, dried and weighed.

EXAMPLE 10

Non-cross-linked, insoluble calcium polyacrylate was rendered soluble by exchange of the calcium ion by sodium ion. The calcium polyacrylate which had been irradiated in Example 5 above was also treated with a solution of sodium ions to effect an exchange. This material, however, remained insoluble, but a large change in volume due to swelling of the material was noted.

EXAMPLE 11

A solution of 358 parts of potassium acrylate, 360 parts of magnesium acrylate and 1,134 parts of calcium acrylate in 6,278 parts of water was subjected to the radiation from a 1 mev. resonant transformer until it had received a dose of 3.3 megarads. A solid mass of polymer, insoluble in water, was obtained. Analysis disclosed a molar ratio of K:Mg:Ca of about 1.3:1:1.3.

EXAMPLE 12

Approximately saturated solutions of the acrylate salts of tin, lead, strontium, nickel, zinc, barium, cobalt and cadmium were subjected to a dosage of 12 megarads of ionizing radiation from a 2 mev. resonant transformer. Each of the solutions deposited insoluble polymers. These insoluble products could not be dissolved in an aqueous solution of potassium hydroxide although they swelled strongly in contact with such solution.

EXAMPLE 13

Plastic flower pots having a diameter of 7 inches were filled with an air-dried commercial potting soil to a depth of about 6 inches. Gelled mixtures of 11.4 grams of cross-linked ammonium polyacrylate in 400 grams of water were poured evenly over the potting soil in each of three pots. A second mixture, composed of more finely divided gel particles in water, was prepared by allowing 5.7 grams of cross-linked ammonium polyacrylate to swell in 200 grams of water and agitating the resulting mixture in a Waring Blendor. This mixture was used to treat the soil in a fourth pot. To the soil in each of four other pots 400 grams of water were added. All of the pots were allowed to stand in a greenhouse for 27 days. Water was then added to each sample to bring the soil to field capacity or to that point at which no more water would drain by gravity from the soil. The pots and contents were then weighed, allowed to stand in the greenhouse for 10 days and again weighed. They were weighed again after 16 days had elapsed. The loss of water at the expiration of each period was determined. The results are summarized in Table I, below.

*Table I*

| Treatment, lbs. of cross linked ammonium polyacrylate per sq. ft. | Average water loss, gms., after— | |
|---|---|---|
| | 10 days | 16 days |
| 0.05 [1] | 165 | 253 |
| 0.10 | 257 | 388 |
| 0.0 (control) | 499 | 541 |

[1] Material well dispersed in water with Waring Blendor.

What is claimed is:

1. A process for the preparation of water insoluble cross-linked salts of polyacrylic acid comprising exposing to a total dose of high energy ionizing radiation of from about 0.001 megarad to about 50 megarads at an intensity of at least 0.27 megarad per hour an aqueous system containing from about 20 percent to about 80 percent by weight of water and correspondingly from about 80 percent to about 20 percent by weight of a salt of an acid selected from the group consisting of acrylic acid and polyacrylic acid, said salt being a member of the group consisting of the alkali salts, the alkaline earth metal salts and salts of the elements magnesium, tin, lead, nickel, zinc, cobalt, and cadmium.

2. A process for the preparation of water insoluble cross-linked salts of polyacrylic acid comprising exposing to a total dose of high energy ionizing radiation of from about 0.001 megarad to about 50 megarads at an intensity of at least 0.27 megarad per hour an aqueous system containing from about 20 percent to about 80 percent by weight of water and correspondingly from about 80 percent to about 20 percent by weight of the magnesium salt of acrylic acid.

3. A process for the preparation of water insoluble cross-linked salts of polyacrylic acid comprising exposing to a total dose of high energy ionizing radiation of from about 0.001 megarad to about 50 megarads at an intensity of at least 0.27 megarad per hour an aqueous system containing from about 20 percent to about 80 percent by weight of water and correspondingly from about 80 percent to about 20 percent by weight of the calcium salt of acrylic acid.

4. A process for the preparation of water insoluble cross-linked salts of polyacrylic acid comprising exposing to a total dose of high energy ionizing radiation of from about 0.001 megarad to about 50 megarads at an intensity of at least 0.27 megarad per hour an aqueous system containing from about 20 percent to about 80 percent by weight of water and correspondingly from about 80 percent to about 20 percent by weight of an alkali salt of acrylic acid.

5. A process according to claim 4, wherein the alkali salt of acrylic acid is the ammonium salt.

6. A process according to claim 4, wherein the alkali salt of acrylic acid is the potassium salt.

7. A process for the preparation of water insoluble cross-linked salts of polyacrylic acid comprising exposing to a total dose of high energy ionizing radiation of from about 0.001 megarad to about 50 megarads at an intensity of at least 0.27 megarad per hour an aqueous system containing from about 20 percent to about 80 percent by weight of water and correspondingly from about 80 percent to about 20 percent by weight of an alkali salt of polyacrylic acid.

8. A process according to claim 7, wherein the alkali salt of polyacrylic acid is the ammonium salt.

9. A process according to claim 7, wherein the alkali salt of polyacrylic acid is the sodium salt.

10. A process according to claim 7, wherein the alkali salt of polyacrylic acid is the potassium salt.

References Cited in the file of this patent

UNITED STATES PATENTS 2,964,456    Saunders _____ Dec. 13, 1960

FOREIGN PATENTS 665,263    Great Britain _____ Jan. 23, 1952

OTHER REFERENCES

Restaino et al.: Journal Amer. Chem. Soc., volume 78 (July 5, 1956), pages 2939–43.